Figure 1:
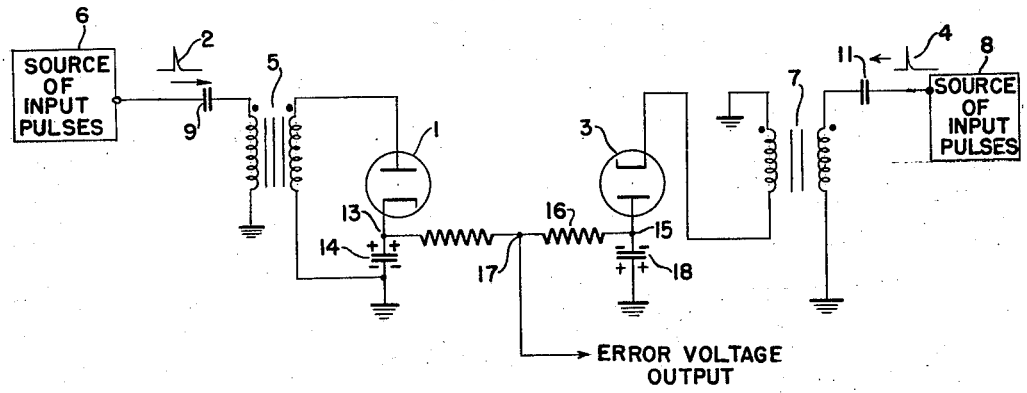

May 20, 1952     E. B. HALES     2,597,725
BALANCED DEMODULATOR
Filed Sept. 18, 1945

INVENTOR
EVERETT B. HALES
BY
ATTORNEY

Patented May 20, 1952

2,597,725

UNITED STATES PATENT OFFICE 2,597,725

BALANCED DEMODULATOR

Everett B. Hales, Cambridge, Mass., assignor, by mesne assignments, to the United States of America as represented by the Secretary of the Navy Application September 18, 1945, Serial No. 617,147

10 Claims. (Cl. 250—27)

This invention relates to balanced demodulator circuits and particularly to such a circuit particularly adapted for use in double gate or double video automatic range tracking circuits of radio echo systems.

In such range systems the video signal derived from a returning echo from a particular target is made to coincide with two narrow positive gate pulses which are timed to correspond to a distance equal to the range of the target. The tracking gate pulses are not simultaneous but one closely follows the other either with or without overlapping. The coincidence of the signal and each respective gate pulse is used to produce respective outputs whose amplitudes are dependent upon the relative position of each respective gate pulse with respect to the signal. For the purpose of automatic tracking it is desired that the signal be kept positioned between the two gate pulses. If the signal moves due to a changing range of the target, its position with respect to the gate pulses will be changed and the resultant outputs due to coincidence will change and differ from each other. This difference between the outputs is then used by means of a balanced demodulator circuit to move the gate pulses in or out in range to reestablish equilibrium between the two outputs. The gate pulses thus will follow the signal and provide a constant indication of range. A similar result can also be obtained by use of one gate pulse and two separate video signals.

It is important therefore when the two outputs are equal that they combine in the demodulator to yield zero voltage and so leave the gate pulses unaffected. A number of circuits have been heretofore constructed for performing the detection and substraction of the two respective voltages but have been subject to the possibility of unbalance even when the signal is properly bracketed by the two gate pulses, that is, they would produce a spurious error signal when their output should be zero. Attempts to balance out such spurious error signals by the use of bucking D. C. potentials have been unsatisfactory because when the repetition rate is changed or when the amplitude of the two resultant voltages changes the unbalance returns, such circuits having been sensitive to the wave shape of their two input voltages. Another consideration is that when no echo signal is present in the gate pulses and the receiver is saturating on noise there should be no net output error voltage so that the gate pulses will remain at rest until a moving target echo enters them.

The object of this invention therefore is to provide a stably balanced demodulation circuit which will compare two sets of input pulses and provide an output whose polarity and amplitude depend on the two comparison voltages, and which will yield no output at all when the two inputs are equal or when there is no input.

Another object is to provide such a circuit which will respond only when the two input signals are greater than a predetermined amplitude.

Figure 2:
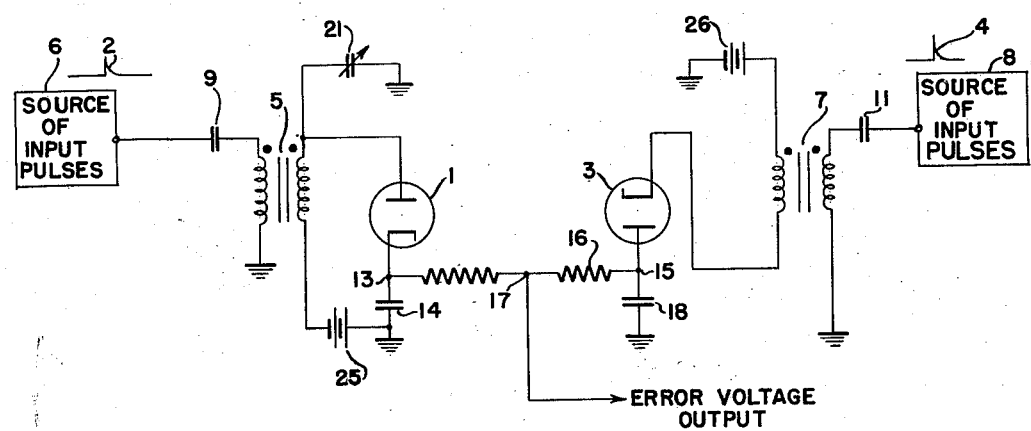

Fig. 1 is a circuit diagram of a balanced demodulator which embodies this invention and Fig. 2 is similar except for the additional elements to improve the balancing adjustment and for rejecting signals of low amplitude.

Referring to Fig. 1, there are shown in diagram two diodes 1 and 3 into which through identical video pulse transformers 5 and 7 the video pulses 2 and 4 from input sources 6 and 8 (which video pulses result from the bracketing of the echo signal by the respective gate pulses, early and late) are respectively coupled. The two video pulses from the two input circuits pass through respective coupling condensers, 9 and 11, and a winding of the respective pulse transformers, 5 and 7, to ground. The secondaries are of such polarity as to cause a pulse to pass through each diode corresponding in voltage to the peak value of the respective input pulse, and in turn causing a charge on respective condensers 14 and 18 of opposing polarity as indicated in the diagram.

As a result the potential of the cathode of the first tube 1 at point 13 will rise to the peak value of the pulse 2 and the plate of the other tube 3 at point 15 will assume a negative potential equal in absolute magnitude to the peak value of the pulse 4. The voltages at points 13 and 15 are added algebraically at midpoint 17 of a resistor 16 connecting points 13 and 15. Hence if the two input signals 2 and 4 are equal the voltage output at 17 will be zero, which is a valuable feature of this circuit. Likewise when there is no target signal present and the receiver is saturating no noise, there will be no appreciable error voltage output from this circuit, provided, of course, the gain of the two video channels preceding the demodulator is equal, in which case the noise derived inputs to the two demodulator channels will give the same size signal. Since zero error voltage from the demodulator will fix the tracking rate of the range tracking servo at zero the gate pulses will remain substantially at rest until a moving target echo enters the gates.

Another advantage of the present circuit is its capability of nearly perfect balance. The two diodes 1 and 3 may be in the same envelope and so under same temperature conditions, and contact potentials may be nearly equal. The circuit is a true peak detector and not sensitive to the wave shape of the input signals. Ordinarily the two inputs will have the same sign, and the polarity reversal for the sake of subtraction is performed by the transformers without introducing any unbalance.

Referring now to Fig. 2 there is shown substantially the same circuit as that illustrated in Fig. 1 with certain improvements incorporated therein. A trimmer condenser 21 has been connected between the plate of diode 1 and ground to balance out the difference in the capacitance, plate to ground, on one hand, and cathode to ground on the other, since the two channels are unsymmetrical in this respect. In addition, if there is slight lack of symmetry in the interwinding capacitances of the two transformers 5 and 7 it may be balanced out at the same time.

Provision is also made in this embodiment of Fig. 2 for rejecting signals of low amplitude by placing D. C. bias potentials, 25 and 26 in series with the respective diodes 1 and 3 of polarity to oppose the voltage induced in the diode circuit and so require a certain minimum value of induced voltage before the diodes become operative.

What is claimed is:

1. A balanced demodulator circuit for producing an output error voltage whose amplitude and polarity is dependent on the relative amplitudes of two sets of input pulses, comprising a pair of transformers, each of said transformers having a diode and a condenser in series circuit connection with its secondary, said diodes being oppositely poled with respect to said transformers, having the junctions of said condensers and said secondaries grounded, and having a resistance between the junctions of condenser and cathode of one diode and condenser and plate of the other diode, the mid-point of said resistance being tapped to provide an output error voltage corresponding to the difference between the amplitudes of pulses fed to the respective primary windings of said transformers.

2. A balanced demodulator circuit for producing an output error voltage of polarity and amplitude dependent on the comparison of two sets of input pulses, comprising a pair of transformers, each of said transformers having a diode, a condenser and a bias potential source connected in a series circuit with the secondary thereof, said diodes being oppositely poled with respect to said transformers, having the junctions of said condensers and said bias sources grounded, having the plate of one of said diodes grounded through a trimmer condenser, and having a resistance between the junction of condenser and cathode of one diode and of condenser and plate of the other diode, the midpoint of said resistance being tapped for providing said output voltage.

3. A balanced demodulator circuit for producing an output error voltage whose amplitude and polarity is dependent on the relative amplitudes of two sets of input pulses, comprising a pair of transformers, each of said transformers having a diode, a condenser and a bias potential source connected in a series circuit with the secondary thereof, said diodes being oppositely poled with respect to said transformers, having the junctions of said condensers and said bias sources grounded, and having a resistance between the junctions of condenser and cathode of one diode and of condenser and plate of the other diode, the midpoint of said resistance being tapped for providing said output voltage.

4. A balanced demodulator circuit for producing an output error voltage whose amplitude and polarity is dependent on the relative amplitudes of two sets of input pulses, comprising a pair of transformers, each of said transformers having a diode and a condenser connected in a series circuit with the secondary thereof, said diodes being oppositely poled with respect to said transformers, having the junctions of said condensers and said secondaries grounded, having the plate of one of said diodes grounded through a trimmer condenser, and having a resistance between the junctions of condenser and cathode of one diode and of condenser and plate of the other diode, the mid-point of said resistance being tapped for providing said output voltage.

5. A circuit for producing an output error voltage whose amplitude and polarity are dependent on the relative amplitudes of two series of input pulses comprising, a pair of transformers, each having a primary and a secondary, each of said transformers having a rectifying element and a condenser serially connected with the secondary thereof, said rectifying elements being oppositely poled with respect to said transformers, the junctions of said secondaries with their respective condensers being grounded whereby upon conduction of said rectifying elements the ungrounded plates of said condensers respectively acquire positive and negative charges, a resistance connected between the ungrounded plates of said condensers, the midpoint of said resistance being tapped for providing said output voltage.

6. A circuit for producing an output error voltage whose amplitude and polarity are dependent on the relative amplitudes of two series of input pulses comprising a pair of transformers each having a primary and a secondary, a diode and a condenser serially connected with each of said secondaries, one plate of each of said condensers being grounded, said diodes being oppositely poled with respect to said transformers, means biasing said diodes to prevent conduction thereof when said input signals are below a predetermined amplitude, means coupled to one of said diodes to balance the difference in plate to ground, and cathode to ground capacitance of said diodes, the ungrounded plates of said condensers upon conduction of said diodes acquiring a charge thereon of opposite polarity, and a resistance connected between the ungrounded plates of said condensers, the midpoint of said resistance being tapped for providing said output voltage.

7. A circuit for producing an output error voltage whose amplitude and polarity are dependent on the relative amplitudes of two series of input pulses comprising, a pair of transformers each having a primary and a secondary, a diode and a condenser serially connected to each of said secondaries, one plate of each of said condensers being grounded, said diodes being oppositely poled with respect to said transformers, means biasing said diodes to prevent conduction thereof when said input signals are below a predetermined amplitude, the ungrounded plates of said condensers upon conduction of said diodes acquiring a charge thereon of opposite polarity, and a resistance connected between the ungrounded plates of said condensers, the midpoint of said resistance being tapped for providing said output voltage.

8. A circuit for producing an output error voltage whose amplitude and polarity are dependent on the relative amplitudes of two input signals comprising a pair of transformers each having a primary and a secondary, a rectifying element and a storage device serially connected with the secondary of each of said transformers, one terminal of each of said storage devices being grounded, said rectifying elements being oppositely poled with respect to said transformers, and a resistance connected between the ungrounded terminals of said storage devices, the mid-point of said resistance being tapped for providing said output voltages.

9. A circuit for producing an output error voltage whose amplitude and polarity are dependent on the relative amplitudes of two input signals comprising, a pair of transformers each having a primary and a secondary, a rectifying element and a storage device serially connected with the secondary of each of said transformers, one terminal of each of said storage devices being grounded, means biasing said rectifying elements to prevent conduction thereof when said input signals are below a predetermined value, and a resistance connected between the ungrounded terminals of said storage devices, the mid-point of said resistance being tapped for providing said output voltages.

10. A circuit for producing an output error voltage whose amplitude and polarity are dependent on the relative amplitudes of two input signals comprising, a pair of transformers each having a primary and a secondary, a rectifying element and a storage device serially connected with the secondary of each of said transformers, one terminal of each of said storage devices being grounded, said rectifying elements being oppositely poled with respect to said transformers, means biasing said rectifying elements to prevent conduction thereof when said signals are below a predetermined value, means coupled to one of said rectifying elements for balancing the difference in capacitance to ground of said rectifying elements, and a resistance connected between the ungrounded terminals of said storage device, the mid-point of said resistance being tapped for producing said output voltages.

EVERETT B. HALES.

REFERENCES CITED

The following references are of record in the file of this patent:

UNITED STATES PATENTS

| Number | Name | Date |
|---|---|---|
| 2,176,742 | La Pierre | Oct. 17, 1939 |
| 2,309,481 | Summerhayes | Jan. 26, 1943 |
| 2,404,026 | Beard | July 16, 1946 |
| 2,406,978 | Wendt | Sept. 3, 1946 |